United States Patent [19]

Casey

[11] Patent Number: 5,758,865
[45] Date of Patent: Jun. 2, 1998

[54] FUEL INJECTION VALVE AND ENGINE INCLUDING THE SAME

[75] Inventor: Gary Lee Casey, Thousand Oaks, Calif.

[73] Assignee: Kavlico Corporation, Moorpark, Calif.

[21] Appl. No.: 699,052

[22] Filed: Aug. 21, 1996

[51] Int. Cl.$^6$ ............................................. F16K 31/06
[52] U.S. Cl. ........................... 251/129.21; 251/129.17; 251/331
[58] Field of Search ....................... 251/129.21, 129.17, 251/331

[56] References Cited

U.S. PATENT DOCUMENTS

| | | | |
|---|---|---|---|
| 3,961,644 | 6/1976 | Eckert | 251/129.21 X |
| 4,492,207 | 1/1985 | Hallberg | 123/527 |
| 4,830,286 | 5/1989 | Asslaender et al. | 251/129.16 X |
| 4,856,713 | 8/1989 | Burnett | 239/113 |
| 4,969,629 | 11/1990 | Athanassiu | 251/129.21 X |
| 4,986,246 | 1/1991 | Kessler de Vivie et al. | 251/129.21 X |
| 5,033,716 | 7/1991 | Mesenich | 251/129.21 |
| 5,136,986 | 8/1992 | Jensen | 123/127 GE |
| 5,158,263 | 10/1992 | Shimizu et al. | 251/129.21 |
| 5,199,398 | 4/1993 | Nylund | 123/299 |
| 5,211,341 | 5/1993 | Wieczorek | 239/585.3 |
| 5,328,100 | 7/1994 | Bergstrom et al. | 251/129.21 |
| 5,370,320 | 12/1994 | Sofer | 251/129.21 X |
| 5,474,100 | 12/1995 | Nishijima et al. | 251/129.21 X |
| 5,560,585 | 10/1996 | Krimmer et al. | 251/129.21 |

FOREIGN PATENT DOCUMENTS

| | | | |
|---|---|---|---|
| 0115906 | 8/1984 | European Pat. Off. | 251/129.21 |

*Primary Examiner*—John Rivell
*Attorney, Agent, or Firm*—Oppenheimer Poms Smith

[57] ABSTRACT

A valve including a housing defining an interior, entry port, an exit orifice, and a fuel path between the entry port and exit orifice, a magnetic coil associated with the interior of the housing, and a resilient valve element defining an outer section fixedly secured to the housing, an interior section engaging and closing the exit orifice, and a spring section between the outer section and the interior section defining at least one aperture. The resilient valve element will be deflected such that the interior section of the valve element is disengaged and spaced apart from the exit orifice in response to an application of a predetermined voltage to the coil.

4 Claims, 5 Drawing Sheets

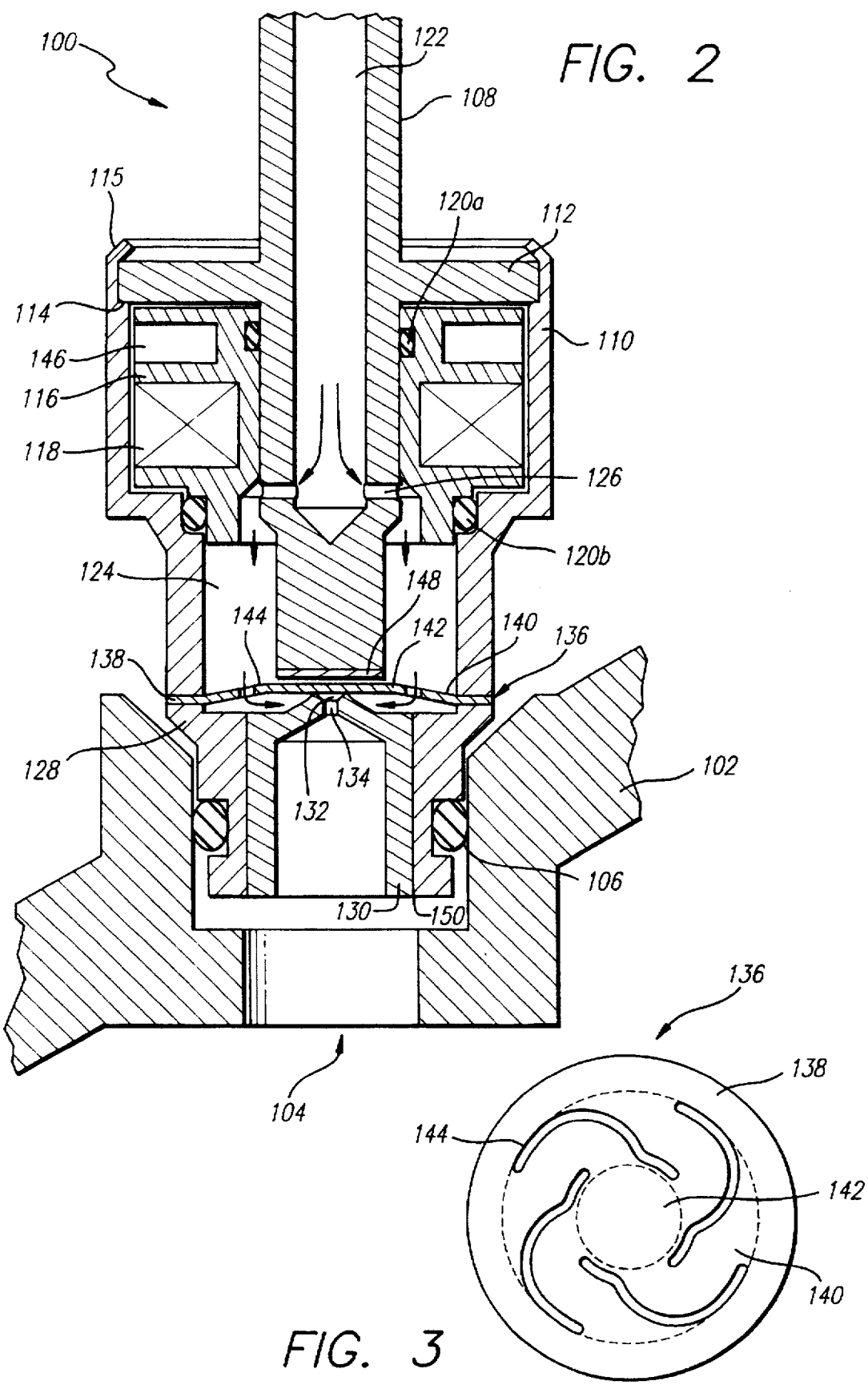

FUEL INJECTION VALVE AND ENGINE INCLUDING THE SAME

BACKGROUND OF THE INVENTION

1. Field of Invention

The present invention relates generally to engines and, more particularly, to a valve which may be used in a fuel injection system.

2. Description of the Related Art

Liquid fuel combustion engines, such as those fueled by gasoline, have been in existence for many, many years. These engines include a cylinder block having a series of cylinders with pistons operating therein. The pistons are connected to respective connecting rods which are in turn connected to a crankshaft. A head is mounted on top of each cylinder. Combustion chambers are located between the heads and pistons. Some combustion engines also include fuel injection systems which are used to control the flow of fuel to the combustion chamber.

Heretofore, fast acting solenoid valves have been used as fuel injectors. One example of such a solenoid valve is shown in FIG. 1a. The fuel injector valve 10 includes a includes a housing 12 into which fuel flows through entry holes 14. The outlet 16 is closed by a sphere 18 which acts as the valve element. The solenoid assembly consists of a stator coil 20, an armature 22, a core 24 and a biasing spring 26. The end of the core 24 includes a non-magnetic ring 28. The core 24 acts as a stop and also forms part of the magnetic path. A small active air gap 30 is formed between the end of the ring 28 and the armature 22. A plurality of non-magnetic guides 32 guide the armature 22 and sphere 18 as they move. A plurality of small auxiliary air gaps 34 are formed between the stator 12 and the armature 22 by the guides 32. The biasing spring 26 forces the armature 22 and sphere 18 into the closed orientation shown in FIG. 1a. Energization of the stator coil 20 will cause the armature 22 to compress the biasing spring 26 and pull the sphere 18 away from the outlet 16, thereby allowing fuel to pass.

Another example of a known solenoid valve, which is similar to, but slightly more precise than, the valve shown in FIG. 1a, is shown in FIG. 1b. Here, in addition to the common elements described above, the fuel injector valve 36 includes a housing 38 which has an inlet 40 and an outlet 42. The outlet is closed by a pintle 44 which is attached to an armature 46. When stator coil 38 is energized, the armature will overcome the biasing force of the spring, thereby allowing liquid to flow from the outlet 42.

Fuel is supplied to the solenoid valves under a constant fuel pressure and the solenoids are energized in phase with engine rotation. Thus, the flow of fuel through the valve is a function of the frequency and duration of the valve openings. The flow rate of a fully opened valve is set to be somewhat larger than the engine requires so that the fuel flow rate can be accurately controlled even at the highest engine speeds. Typical fuel injectors produce flow rates equal to that produced by an orifice that is 0.025 inches in diameter orifice which has opening and closing times of 2.0 and 1.3 milliseconds, respectively. The system fuel pressure is typically held at 39 psi above manifold pressure.

Recently, economic and environmental conditions have led to an increasing demand for engines which run on alternate fuels, such as methanol or ethanol mixed in various blends with gasoline or gaseous fuels such as propane or methane (natural gas). Dual-fuel engines are capable of running on gaseous fuel, liquid fuel, or a combination of the two. Such engines can provide better fuel efficiency and lower emissions than those which run on gasoline only.

The use of alternate fuels has created performance problems for fuel injectors. Some fuels require different fuel injector characteristics than others. Alcohol-based fuels, for example, create problems of material compatibility and require somewhat higher volumetric flow than typical fuels. However, with modest fuel injector material and design modifications, alcohol-based fuels have been accommodated with some success. The accommodation of natural gas fuel has not been as easy. In order to allow the required volume of natural gas flow, the injector must be much larger than those used with gasoline and must operate at about twice the fuel pressure. Another problem associated with the use of natural gas is that it does not provide the lubrication for the fuel injector that liquid fuel provides. Without such lubrication, friction between the armature and guides can cause substantial wear. Thus, although natural gas fuel injectors are available, the durability and performance is considered by some to be inadequate.

SUMMARY OF THE INVENTION

A general object of the present invention is to provide a dual-fuel engine which is superior to those previously known in the art. In particular, one object of the present invention is to provide a dual-fuel engine which includes a fuel injector system that is superior to those previously known in the art. Another object of the present invention is to provide a solenoid valve that may be used in a fuel injector system and that is capable of regulating the flow of liquid fuel alone, a gaseous fuel/liquid fuel mixture, or gaseous fuel alone. Still another object of the present invention is to provide a solenoid valve that may be used in a fuel injector system and that may be switched between fuels while running. Yet another object of the present invention is to provide a solenoid valve that may be used in a fuel injector system and that is more resistant to wear than those presently known in the art.

In accordance with one aspect of the present invention, these and other objectives are accomplished by providing a valve which includes a housing defining an exit orifice, a magnetic coil associated with the interior of the housing, and a resilient valve element defining an outer section fixedly secured to the housing, an interior section engaging and closing the exit orifice, and a spring section between the outer section and the interior section defining at least one aperture. The resilient valve element will be deflected such that the interior section of the valve element is disengaged and spaced apart from the exit orifice when voltage is applied to the coil.

The present invention provides a number of advantages over prior fuel injection valve designs. For example, the sliding motion between moving parts associated with prior designs has been eliminated. As a result, the wear due to the friction associated with the use of natural gas fuel has also been eliminated. The number of parts in the present valve is also significantly lower than that typically found in prior designs. Assembly and calibration of the valve are also simplified because the valve element has a relatively low mass and its spring rate can be accurately controlled. The present design also lacks the auxiliary air gap associated with prior designs. Thus, the present magnetic circuit is more efficient than prior designs and the amount of iron and/or copper in the coil may be reduced. The reduction in coil size allows the overall size of the valve to be reduced.

Many other features and attendant advantages of the present invention will become apparent as the invention becomes better understood by reference to the following detailed description considered in conjunction with the accompanying drawings.

BRIEF DESCRIPTION OF THE DRAWINGS

Detailed description of the preferred embodiment of the invention will be made with reference to the accompanying drawings.

FIG. 2 is cross-section view of a valve system in accordance with a preferred embodiment of the present invention;

FIG. 3 is a plan view of a valve element in accordance with the preferred embodiment shown in FIG. 3;

DETAILED DESCRIPTION OF THE PREFERRED EMBODIMENTS

Figure 1A:
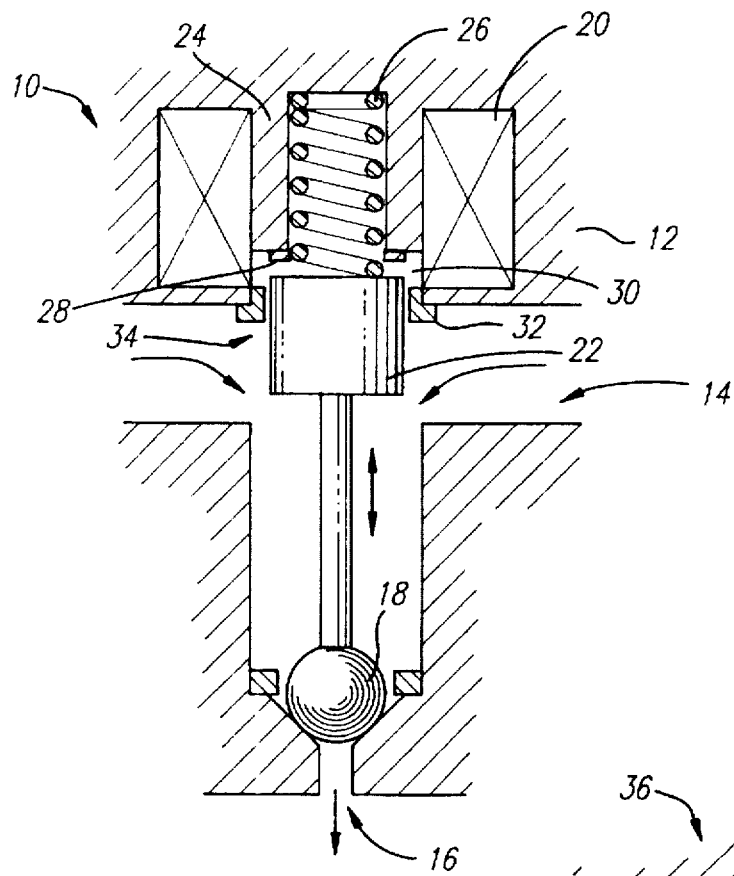
FIGS. 1a and 1b are cross-section views of known liquid fuel injector valves.
Figure 1B:
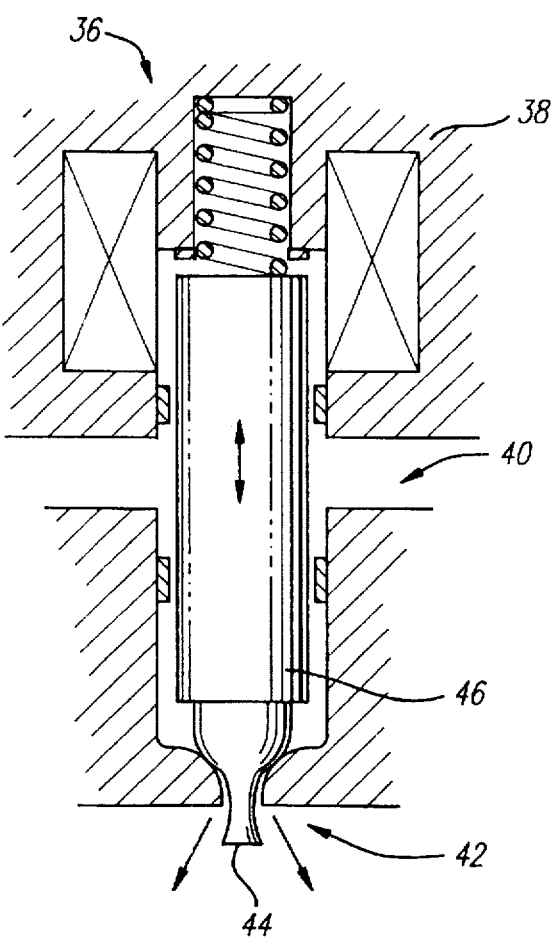

The following is a detailed description of the best presently known mode of carrying out the invention. This description is not to be taken in a limiting sense, but is made merely for the purpose of illustrating the general principles of the invention. The scope of the invention is defined solely by the appended claims.

As shown by way of example in FIG. 2, a solenoid valve 100 in accordance with the present invention may be mounted within an intake manifold fitting 102 of an engine. The intake manifold fitting 102 is associated with the intake port 104 of the engine. A seal 106, such as an o-ring seal, is located between the valve 100 and the intake manifold fitting 102. The valve 100 includes an inner body portion 108 (or stator) that is mounted within an outer body portion 110. A radially extending flange 112 on the inner body portion 108 mates with a shoulder 114 formed in the interior of the outer body portion 110. The flange 112 is held in place by a swage 115. A bobbin 116, which supports a stator coil 118, is mounted between the inner body portion 108 and the outer body portion 110. The bobbin 116 may also include a pair of seals 120a and 120b, such as o-ring seals, to protect the stator coil 118 from fuel and any other contaminants.

Fuel enters the exemplary valve 100 through a fuel entry port 122 that is formed within the inner body portion 108. The axial end of the entry port may, as shown in the exemplary embodiment, define a generally frusto-conical shape. Fuel exits the entry port 122 and enters a cavity 124 through at least one hole 126 formed therein. Preferably, four equidistant holes 126 are formed in the entry port 122. The valve 100 also includes a nose portion 128 on the side of the cavity 124 opposite the bobbin 116. Thus, the outer body portion 110 and the nose portion 128 generally define the housing of the valve 100. A valve seat 130, which includes a raised seating surface 132 that defines an orifice 134, may be mounted within the nose portion 128. The seating surface 132 and orifice 134 may be sized such that the valve seat 130 produces the desired flow rate into the intake port 104. In the exemplary embodiment, the seating surface diameter is 0.060 inches and the orifice is approximately 0.025 inches.

Referring to FIGS. 2 and 3, the exemplary valve 100 also includes a resilient and magnetically permeable valve element 136 (or armature) which selectively opens and closes the orifice 134. The valve element 136 is "sandwiched" between the outer body portion 110 and the nose portion 128. A low melting temperature material, such as a silver-based solder, may be used to permanently join the outer body portion 110, valve element 136 and nose portion 128 to one another. The valve element 136 may, for the purposes of this discussion, be divided into three sections—an outer section 138, a spring section 140 and an interior section 142. A series of apertures 144 are formed in the valve element 136. The apertures 144 allow fuel to flow from the cavity 124 to the orifice 134. When the valve element 136 is in the orientation shown in FIG. 2, abutting the seating surface 132, the interior section 142 will prevent fuel from entering the orifice 134. An air gap is formed between the interior section 142 and the end of the inner body portion 108. A portion of the air gap is occupied by a non-magnetic air gap shim 148 that is bonded to the end of the inner body portion. The shim is preferably formed from brass. In the illustrated embodiment, the air gap is approximately 0.003 inches and the stroke (the distance from the valve element to the shim) is approximately 0.005 inches.

The valve element 136 is slightly deflected when in the orientation shown in FIG. 2 and, therefore, biased toward the orifice 134. The spring force of the valve element 136 (approximately 0.5 lbs. in the illustrated embodiment) and the pressure from the fuel create a sufficient amount of seating force to prevent the fuel in the interior section 142 of the valve element from leaking past the valve seat 132 shown in FIG. 2. The apertures 144 increase the flexibility of the valve element 136 over that which would be obtained by a solid disk. The diameter of the valve element 136 should be maximized, given the dimensional constraints associated with the environment in which the valve 100 is to be used. As such, the valve element 136 should extend to outer surface of the outer body portion 110. In addition, the apertures 144 must be configured such that the desired spring rate is provided at a low stress level and the interior section 142 is flat and centered over the orifice 134.

When a predetermined voltage is applied to the stator coil 118, a magnetic force will be generated. The magnetic force causes the valve element 136 to deflect in the direction of the shim 148, thereby allowing fuel to pass through the orifice 134. The period of voltage application may be varied in accordance with the desired volume of flow through the valve.

With respect to materials, the inner body portion 108, outer body portion 110 and nose portion 128 are preferably formed from 12L14 or 1117 steel that has been zinc or nickel plated. The bobbin 116 may be made of plastic and the stator coil 118 may be formed from either copper or brass wire. Because of the low mass of the valve element and the efficiency of the magnetic path, the present valve requires less wire than conventional solenoid valves. In order to provide the desired resistance and improve the response time, the coil 118 may be formed from a high resistance wire such as, for example, the aforementioned brass wire. The use of such wire will, however, add bulk to the coil. Alternately, smaller diameter copper wire may be used in combination with a series resistor. A space 146 may be formed in the bobbin 116 for the resistor (if used) as well as for wire terminations. A conventional overmolded connector (not shown) may also be employed.

The valve element 136 is preferably manufactured from flat magnetic steel stock and may be precision ground to the desired thickness. The thickness of the exemplary valve element 136 is approximately 0.015 inches. Suitable materials include 400-series stainless steel and low-carbon steel that is plated with electroless nickel. The steel should also be magnetically soft in order to respond to changing magnetic flux. The valve element 136 should not be subjected to any forming process which could effect the flatness of the interior section 142. As such, the outer diameter of the valve element 136 and the slots 144 should be formed with a non-stressing process such as photo-etching. It is also noteworthy that the portions of the spring section 140 that are separated by the apertures 144 transfer the flux from the outer section 138 to the interior section 142, thereby eliminating the auxiliary air gap found in prior valves and increasing the efficiency of the magnetic circuit. Finally, because of the accuracy inherent in the grinding and photo-etching processes, it is not expected that the spring load of the valve element will have to be adjustable. Instead, the valve element should be configured such that it provides the desired spring load.

The preferred embodiment shown in FIG. 2 may be manufactured in the following manner. First, the inner body portion 108 (or stator), including the shim 148, and the outer body portion 110 are measured using the shoulder 114 as a reference point. The outer body portion 110 is then ground to a length that will produce the desired preload on the valve element 136. Next, the outer body portion 110, valve element 136, and nose portion 128 are mounted in a fixture and clamped together with silver solder paste or preforms therebetween and then heated in a furnace. The inner body portion 108 is inserted into the bobbin 116 and both are then inserted into the outer body portion 110. As noted above, the inner body portion can be fixed in place by the swage 115. The overmolding of the connector (not shown) may be performed at this point in the manufacturing process.

In the next step of the exemplary manufacturing and assembly process, the valve seat 130 is inserted into the nose portion 128 and then slowly pressed inward while the coil 118 is energized and the valve element 136 is lifted against the air gap shim 148. This portion of the process is performed while fluid flows through the solenoid valve 100. As the valve seat 130 approaches the lower surface of the valve element 136, the fluid flow rate will begin to drop. Once the flow rate reaches the desired level, the valve seat 130 is permanently secured to the nose portion 128 by, for example, a swage in the root of the groove formed for the seal 106. As an alternative, the valve seat 130 may be laser welded at interface 150.

So assembled, the flow rate through the present solenoid valve 100 is controlled by a number of variables. The most influential variable (approximately 90%) is, of course, the diameter of the orifice 134. The flow rate may be "fine tuned" by adjusting the stroke of the valve element 136. Specifically, the opening and closing times of the valve element are controlled by the spring pre-load on the valve element 136 and the size of the air gap between the valve element and the shim 148.

Figure 4:
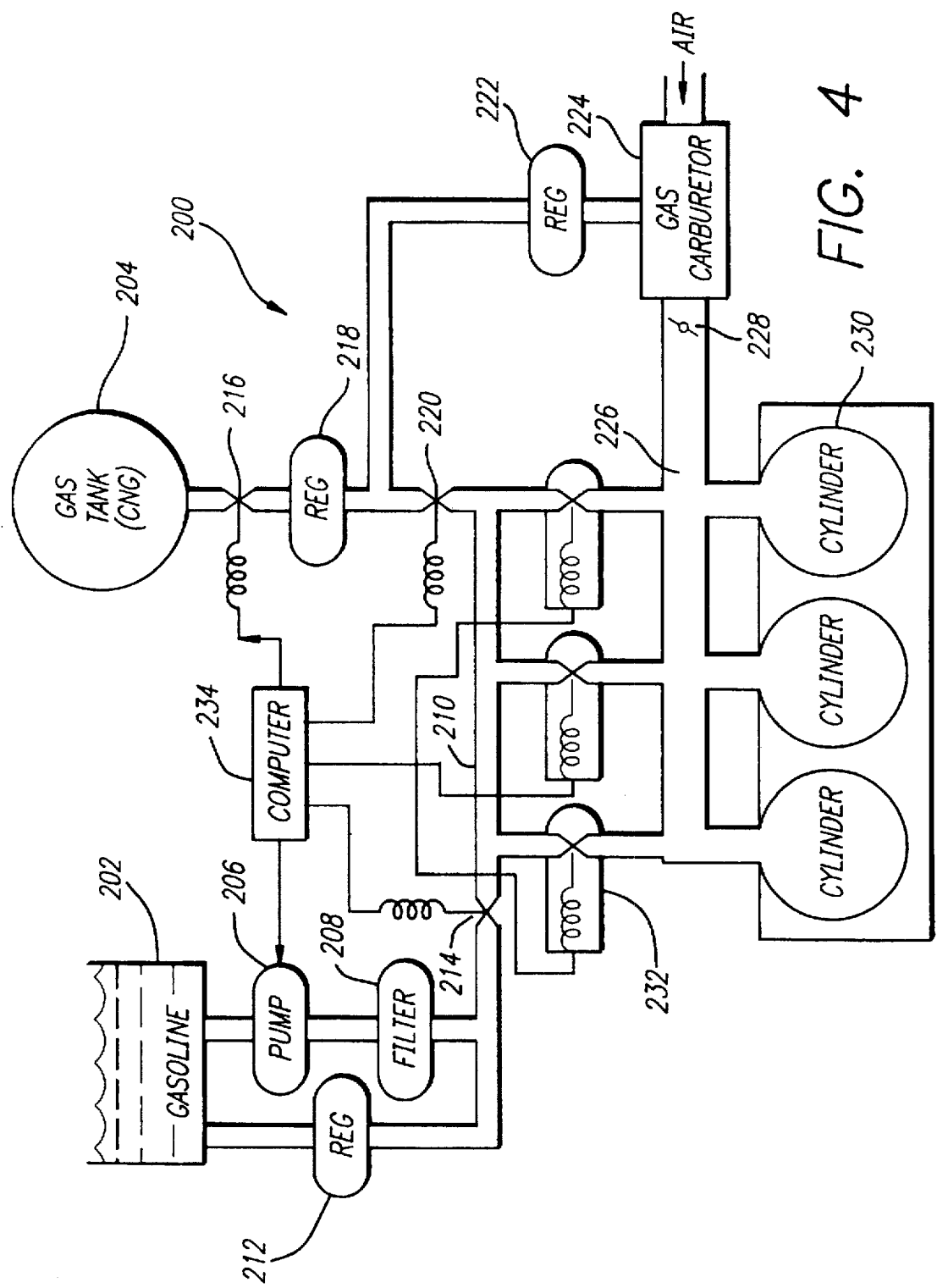
FIG. 4 is a schematic view of a dual-fuel engine in accordance with the present invention.

As shown by way of example in FIG. 4, an exemplary dual-fuel engine 200 in accordance with the present invention includes a first tank 202 for storing liquid fuel such as gasoline and a second tank 204 for storing gaseous fuel such as natural gas. A pump 206 pumps the liquid fuel through a filter 208 to a fuel rail 210. A regulator maintains a constant pressure in the fuel rail 210 by returning the appropriate amount of fuel to the tank 202. A shut-off valve 214 is also provided. The flow of fuel from the second (gaseous fuel) tank 204, which is stored at approximately 3000 psi, is controlled by a shut-off valve 216. A regulator 218 reduces the pressure of the fuel supplied to the fuel rail 210 to between approximately 30 and 150 psi. From the regulator 218, the fuel will either be split or will flow in a single direction, depending on the state of a shut-off valve 220 which controls the flow of fuel from the regulator 218 to the fuel rail 210. If the valve is open, some of the fuel will flow to the fuel rail 210 and the remaining fuel will flow through a regulator 222, which reduces the fuel pressure to approximately 10 inches of water below atmospheric pressure, to a carburetor 224. The carburetor 224 includes a metering valve or a venturi which draws the gas into a conventional carburetor. Flow from the carburetor to an intake manifold 226 is controlled by a throttle blade 228.

Figure 5:
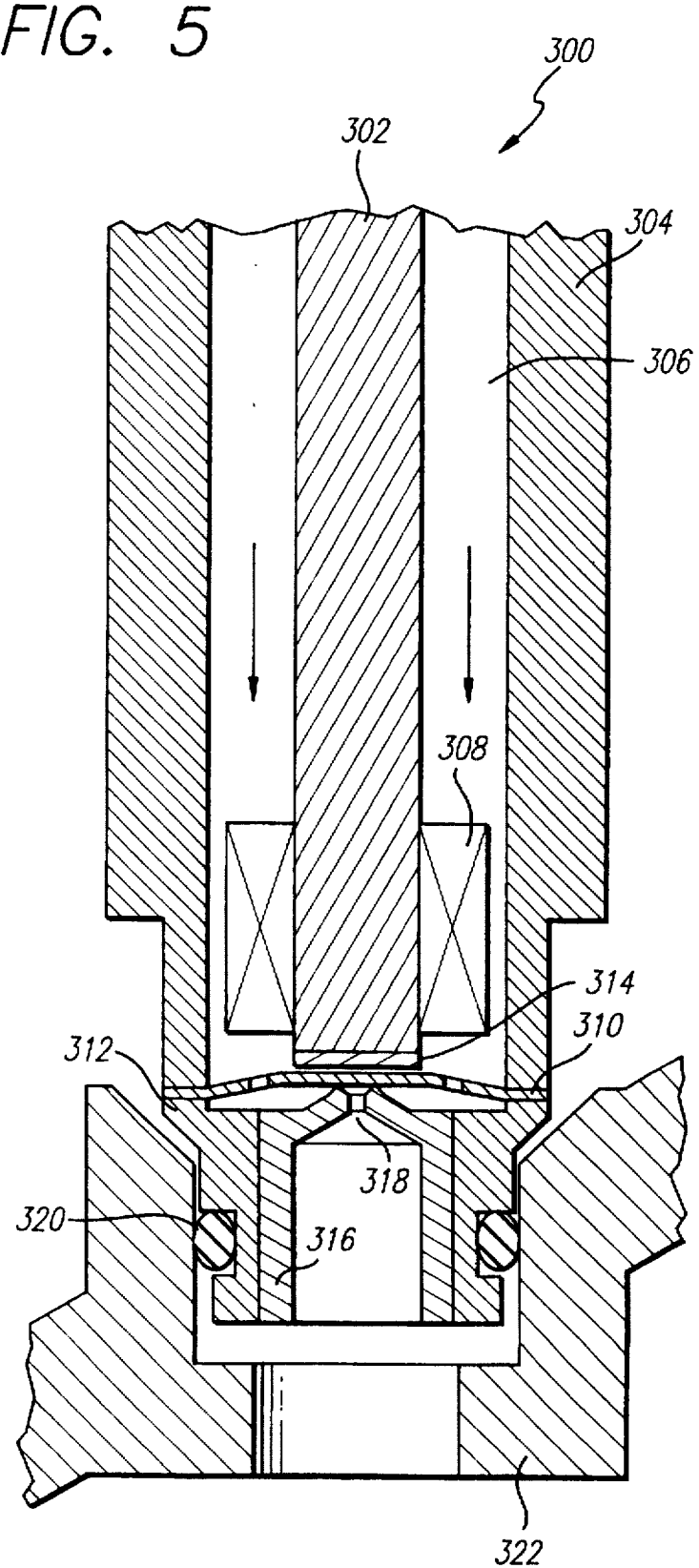
FIG. 5 is cross-section view of a valve system in accordance with another preferred embodiment of the present invention.
Figure 6:
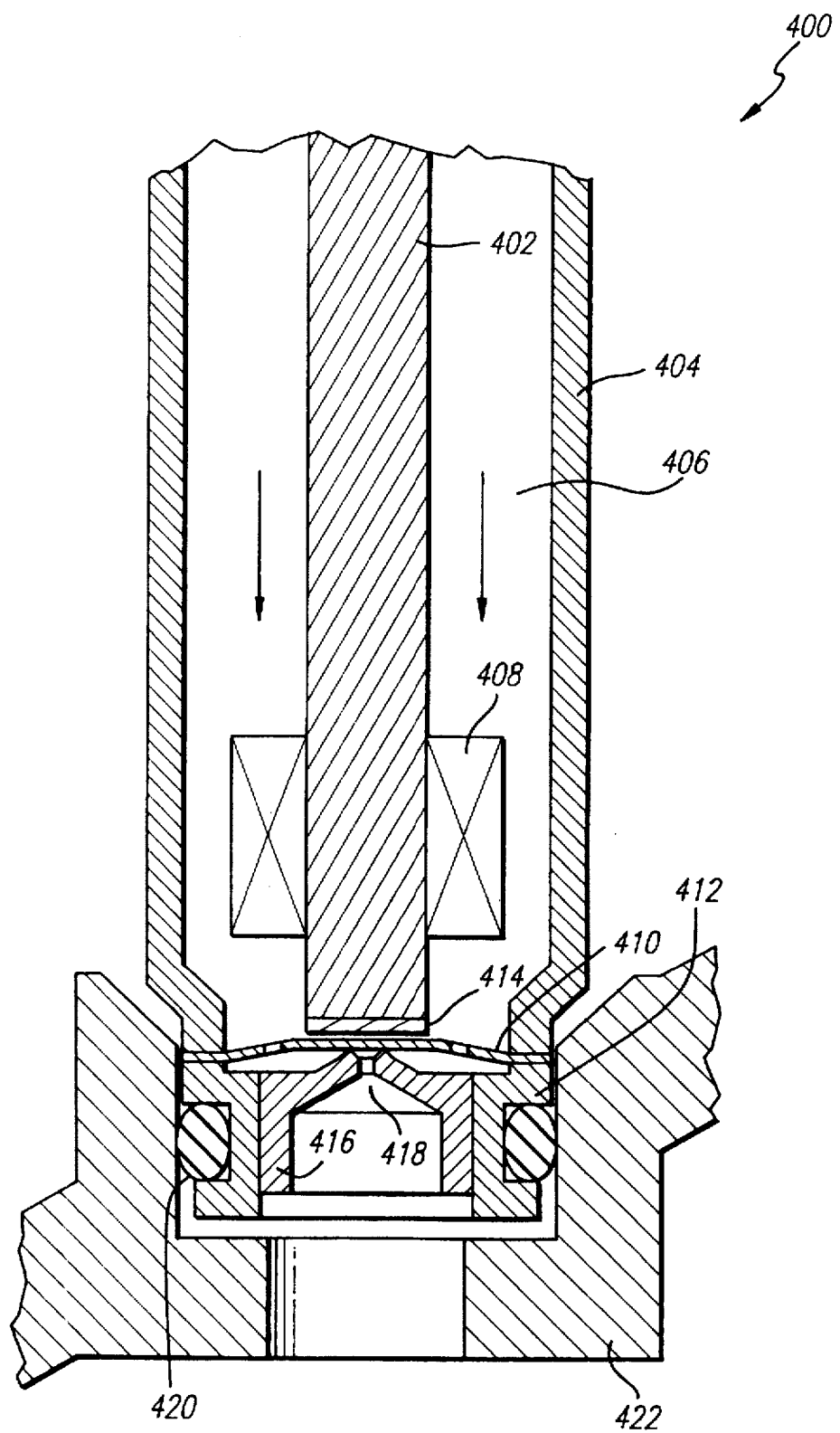
FIG. 6 is cross-section view of a valve system in accordance with still another preferred embodiment of the present invention.

The flow of fuel from the fuel rail 210 to the intake manifold 226 and, ultimately cylinders 230, is regulated by solenoid valves 232 which may be configured in the manner show in FIGS. 2, 5 or 6. [FIGS. 5 and 6 are discussed in detail below.] Finally, an electronic control device 234, such as that typically found in modern combustion engines, is operably connected to pump 206, shut-off valves 214, 216 and 220, and solenoid valves 232.

When the exemplary dual-fuel engine 200 is to be run on liquid fuel alone, shut-off valve 214 is open, shut-off valve 220 is closed and liquid fuel is fed to the fuel rail 210 at a fixed pressure. The electronic control device 234 monitors engine conditions and energizes (i.e. opens) the solenoid valves 232 for the requisite period of time during each engine rotation. When running on natural gas, shut-off valve 214 is closed, shut-off valve 220 is open and gas is supplied to both the fuel rail 210 and the carburetor 224. The air/fuel mixture provided to the intake manifold 226 by the carburetor is preferably slightly lean. The remaining portion of the fuel is supplied by the electronically controlled injectors 232. This allows the amount of fuel supplied to the intake manifold 226 to be precisely controlled. In addition, because only a small percentage of the gaseous fuel is supplied by the valve 232, the valve may remain relatively small. This is typically not the case with systems that regulate natural gas flow due to the low mass flow rate of natural gas.

The present solenoid valve is susceptible to many alternate configurations without departing from the spirit of the invention. Such alternate configurations are useful when the space available for the valve is somewhat limited. As illustrated for example in FIG. 5, a solenoid valve 300 in accordance with the present invention includes an inner body portion (or stator) 302 that is mounted within an outer body portion 304. The inner body portion may be held in place in the manner described above with respect to FIG. 2. A passageway 306 is formed between the inner body portion 302 and the outer body portion 304. A stator coil 308, which is greater in length but smaller in diameter than the coil shown in FIG. 2, is mounted on the inner body portion 302. In contrast to the embodiment shown in FIG. 2, there is no bobbin and seal arrangement to prevent the coil from coming into contact with the fuel. Although it is generally preferable to prevent fuel/coil contact, the bobbin-less valve 300 can be made smaller than a valve such as that shown in FIG. 2 with similar performance characteristics.

The exemplary embodiment shown in FIG. 5 also includes a valve element 310 that is mounted between the outer body portion 304 and a nose portion 312, as well as a non-magnetic shim 314 that is mounted on the end of the inner body portion 302. A valve seat 316 having an orifice 318 is secured to the nose portion 312. A seal 320 which engages the nose portion 312 and an intake manifold fitting 314 is also provided.

Turning to FIG. 6, the exemplary valve 400 shown therein is similar to that shown in FIG. 5, but for the different sizes and shapes of various elements. The valve 400 includes an inner body portion (or stator) 402, an outer body portion 404, and passageway 406 therebetween. A coil 408 is mounted on the inner body portion 402. A valve element 410 is secured between the outer body portion 404 and a nose portion 412 and a non-magnetic shim 414 is secured to the end of the inner body portion 402. A valve seat 416, which defines an orifice 418, is secured to the nose portion 412. A seal 420 engages the nose portion 412 and an intake manifold fitting 414.

Although the present invention has been described in terms of the preferred embodiments above, numerous modifications and/or additions to the above-described preferred embodiments would be readily apparent to one skilled in the art. By way of example, but not limitation, the shape and size of the valve element apertures 144 may be modified. The present solenoid valve may also be used in applications other than fuel injection systems. It is intended that the scope of the present invention extends to all such modifications and/or additions and that the scope of the present invention is limited solely by the claims set forth below.

What is claimed is:

1. A fuel injection valve for use in a dual-fuel engine, comprising:

an outer body portion defining an interior and first and second longitudinal ends;

a ferromagnetic inner body portion defining first and second longitudinal ends and arranged substantially within the interior of the outer body portion such that the first longitudinal end of the inner body portion extends beyond the first longitudinal end of the outer body portion and the second longitudinal end of the outer body portion extends a first predetermined distance beyond the second longitudinal end of the inner body portion, the inner body portion and outer body portion defining a fuel path;

a magnetic coil associated with the inner body portion;

a nose portion associated with the second longitudinal end of the outer body portion;

a valve seat defining an orifice associated with the nose portion, the valve seat extending beyond the second longitudinal end of the outer body portion and into the interior of the outer body portion by a second predetermined distance, the second predetermined distance being substantially less than the first predetermined distance; and a resilient valve element defining an outer section sandwiched between the second longitudinal end of the outer body portion and the nose portion, a substantially flat interior section engaging the valve seat and covering the orifice, and a spring section between the outer section and the interior section defining a plurality of apertures;

wherein the resilient valve element will be deflected such that the interior section of the valve element is disengaged and spaced apart from the orifice in response to an application of a predetermined voltage to the coil.

2. A fuel injection valve as claimed in claim 1, further comprising a non-magnetic element mounted on the second longitudinal end of the inner body portion.

3. A fuel injection valve as claimed in claim 1, wherein the resilient valve element is deflected by the valve seat when the inner section engages the valve seat.

4. A fuel injection valve as claimed in claim 1, further comprising a bobbin and seal arrangement substantially separating the coil from the fuel path.

* * * * *